H. T. SWANTON.
FOWL DECAPITATING DEVICE.
APPLICATION FILED JAN. 19, 1911.

1,081,411.

Patented Dec. 16, 1913.

Inventor
H. T. Swanton

UNITED STATES PATENT OFFICE.

HARVEY T. SWANTON, OF RUBICON, WISCONSIN.

FOWL-DECAPITATING DEVICE.

1,081,411.  Specification of Letters Patent. Patented Dec. 16, 1913.

Application filed January 19, 1911. Serial No. 603,528.

*To all whom it may concern:*

Be it known that I, HARVEY T. SWANTON, a citizen of the United States, residing at Rubicon, in the county of Dodge, State of Wisconsin, have invented certain new and useful Improvements in Fowl-Decapitating Devices; and I do hereby declare the following to be a full, clear, and exact description of the invention, such as will enable others skilled in the art to which it appertains to make and use the same.

This invention relates to improvements in decapitating apparatuses and the leading object in view is to provide an apparatus having a strong and cheaply constructed wire frame adapted to be secured on a chopping block and a knife slidably mounted on the frame and provided with a handle, whereby the knife may be quickly forced against the chopping block for decapitating the heads of fowls.

With the above and other objects in view the invention consists in certain constructions, combinations and arrangements of parts, clearly described in the following specification and clearly illustrated in the accompanying drawings, in which:—

Figure 1:
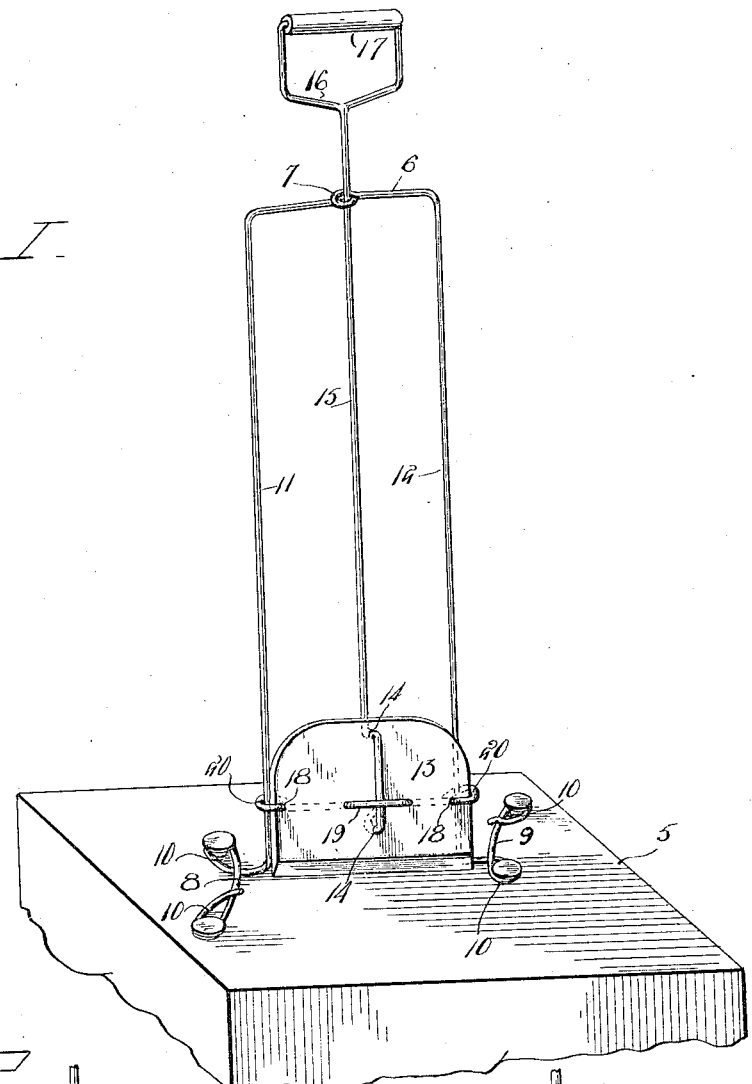
Figure 2:
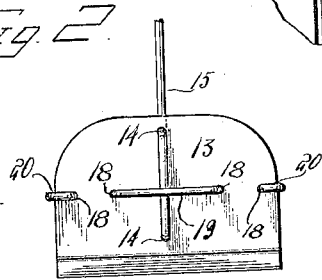
Figure 3:
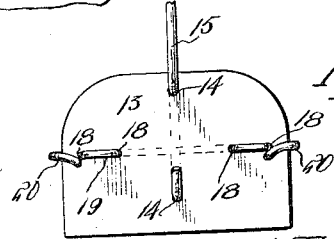

Figure 1 is a perspective view showing the device applied to a chopping block. Fig. 2 is a view of one side of the cutter. Fig. 3 is a view of the other side of the cutter.

Referring to the accompanying drawings, 5 designates a wooden chopping block and 6 the inverted U-shaped wire frame of the decapitating device. The frame 6 is provided with an eye 7 formed in its bight or central portion and with horizontally disposed feet 8 and 9 which are formed by bending the terminals of the frame 6 laterally of the legs of the frame, said feet being provided with eyes 10 through which nails or other fastening means may be passed for holding the device on the block 5. The legs or vertical bars 11 and 12 of the frame 6 form guides for the decapitating knife 13 which is provided with perforations 14. The lower end of a handle rod 15 is passed through the perforations 14 and securely fastened thereby to the knife 13, said handle rod being passed through the eye 7 of the frame 6 and having its upper end looped to form a handle 16 on which a gripping piece 17 is mounted. The knife 13 is also formed with perforations 18 which are located near the outer ends of the knife, and through which a rod 19 is passed. The ends of said rod are formed into eyes 20 which are turned around the legs or bars 11 and 12 of the frame 6, and thus said bars are securely held against lateral movement by the eyes 18.

In using the improved decapitating device a fowl to be beheaded is placed with its head under the lower edge of the knife 13 and said knife is then rapidly forced downward by exerting pressure on the handle 16.

Should it be desired the frame 6 may be secured in a horizontal position as well as a vertical position against any stationary support or stopping block as the case may be.

I claim:—

1. A fowl decapitating device comprising an inverted U-shaped frame formed with an upper bight portion twisted to form an eye, the extremities of the frame being bent to form spaced eyes to receive an anchoring means, a handle having a shank movable vertically through the first named eye, a knife blade carried by the lower end of the shank and a guide member carried by the blade and passing sinuously therethrough to serve as a brace means for the blade, the ends of the guide member engaging the arms of the frame.

2. The combination with a frame having a guide opening and a handle having a shank movable therethrough and between the side portions of the frame; of a blade to which said shank is attached, said blade having vertically spaced apertures through which the shank is sinuously bent and transversely spaced apertures intersecting the same and a securing member passed sinuously through the last named apertures to brace the blade and having its ends coiled around the side portions of the frame to guide the knife during its sliding movements.

In testimony whereof, I affix my signature, in presence of two witnesses.

HARVEY T. SWANTON.

Witnesses:
 JOHN A. KELLY,
 JESSIE S. WILSEY.

Copies of this patent may be obtained for five cents each, by addressing the "Commissioner of Patents, Washington, D. C."